B. S. Church,

Rotary Meter.

N°. 26,014.

Patented Nov. 8, 1859.

Witnesses
Mich Hughes
M. M. Livingston

Inventor
B. S. Church

UNITED STATES PATENT OFFICE.

B. S. CHURCH, OF MANHATTANVILLE, NEW YORK.

WATER-METER.

Specification of Letters Patent No. 26,014, dated November 8, 1859.

*To all whom it may concern:*

Be it known that I, B. S. CHURCH, of Manhattanville, in the county and State of New York, have invented certain new and useful Improvements in Water-Meters; and I do hereby declare that the following is a full, clear, and exact description of the same, reference being had to the accompanying drawing, forming a part of this specification, in which—

Figure 1:
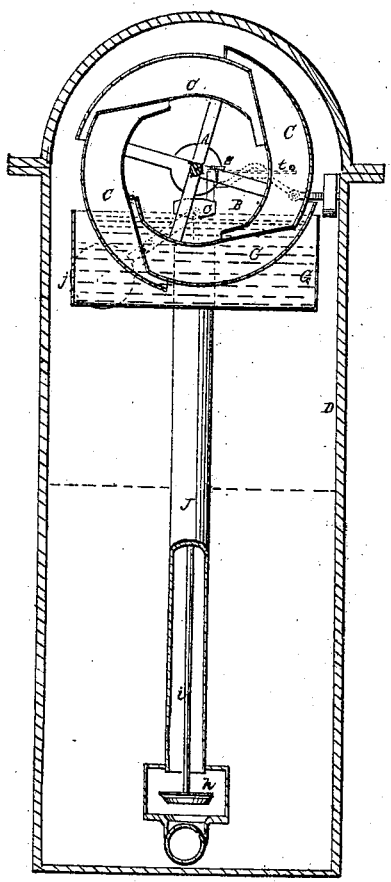
Figure 2:
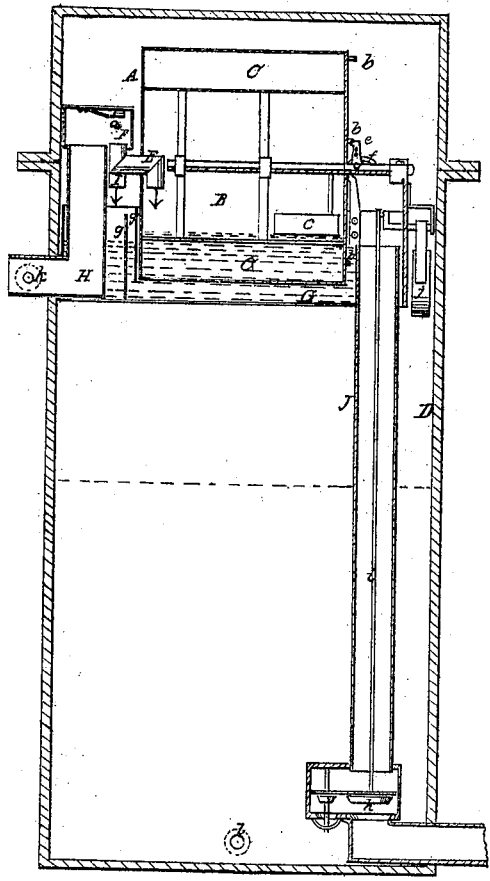
Figure 3:
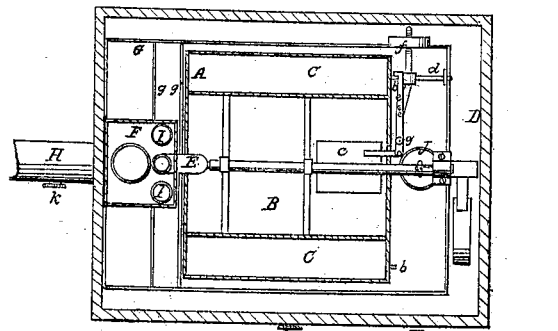

Figure 1 represents a transverse vertical section of my invention. Fig. 2 is a longitudinal vertical section of ditto. Fig. 3 is a horizontal section of the same.

Similar letters of reference in the three views indicate corresponding parts.

Where a large stream passes through the meter, and if the whole stream is measured the buckets or vessels used for measuring have to be very capacious, and the bulk of the whole meter becomes too large and unhandy. For this reason I have subdivided the stream in my meter into a number of equal parts, only one of which passes through the measuring buckets so that a very large stream can be measured by a comparatively small meter. I have also found that the buckets in the water meter, for which a patent has been granted to me on the 30th day of August, 1859, do not fill to a uniform height before the drum begins to rotate, causing the buckets to discharge before they are completely filled. This difficulty I have remedied by arranging in the receiving chamber of the drum a float that connects with a little spring hook on the outside of the drum. Small pins or stops inserted in the side of the drum strike against said hook, and the drum is prevented from rotating until the water in each bucket rises to the desired height and the float in the receiving chamber is raised so high that the hook releases the drum and allows it to rotate, bringing the next succeeding bucket into action. It is also found that the escape of air-bubbles through the discharge tube causes a serious difficulty, for in the same measure as the air is carried off the meter fills with water and the free operation of the drum is interrupted. To guard against this evil I have introduced partitions in such a manner that all the supply water, with the exception of that portion which discharges into the receiving chamber direct has to pass up to the surface of the trough where the air bubbles have a chance to escape, and the water is then carried down under another partition before it is permitted to reach the discharge pipe. It may however happen that by some fault in the castings, or by some other reason the air escapes from the meter, and that the water therein rises beyond the proper height. To indicate this state of things I have arranged a float in such connection with a valve in the discharge tube, that the latter is closed whenever the water rises up to the float and that by the stoppage of the water the attention of the people in the house is called to the existing defect in the meter.

To enable those skilled in the art to make and use my invention I will proceed to describe it.

The drum, A, with the receiving chamber, B, and buckets, C, is the same as it has been described in my former patent on an improved water-meter, dated August 30, 1859. Said drum is arranged in an air-tight chamber, D, and the water enters the chamber, B, through a tube, E, which emanates from a separate chamber, F, and the water from the buckets discharges into a trough, G. The chamber, F, is supplied with water from the service pipe, H, and a number of tubes, I, of equal area with the tube, E, issue from the bottom of this chamber and discharge directly into the trough, G. The receiving mouths of all these tubes are on the same level, so that each of them discharges the same quantity of water, even if not running full and the combined area of the cross sections of all the tubes, I and E, is equal to the area of the cross section of the service-pipe, so that by measuring the quantity of water discharged by the tube, E, the whole quantity supplied by the service-pipe, H, can be ascertained. At the top of the chamber, F, is a self-acting valve, $a$, opening inward. When the chamber fills with water said valve is closed by the pressure on its under side; but if the pressure of the air in the chamber, D, is equal to that of the water in the service-pipe, the valve, $a$, opens and the water ceases to flow in at the service-pipe, H.

In order to compel each bucket to fill completely before the drum is allowed to rotate, pins, $b$, are secured in the side of the drum, and in the interior of the chamber, B, there is a float, $c$, that oscillates up and down on a rock-shaft, $d$. This float connects with a spring hook, $e$, and it is balanced by a counterpoise, $f$, (see Fig. 3). The hook, $e$, is so adjusted by means of a set-screw, $g$, that the pins, $b$, strike against it and prevent the drum rotating until the float rises to a certain height. As soon as this takes place the drum is released and the next succeeding bucket is brought into action. The pins are placed opposite the buckets, so that the latter are retained in a position favorable for the water to enter and fill one after the other, and whenever one of the buckets is filled to the desired height the hook, by the action of the float in the receiving chamber, B, releases the pin opposite to said bucket, and allows the next succeeding one to take its place.

The arrangement of the pipes, I, which discharge directly into the trough, G, makes it necessary to guard against the loss of air which would take place if the water was allowed to flow without interruption from said pipes to the discharge tube, J. For this reason partitions, $g$ $g'$, are placed into the trough, G. The first one of these partitions, $g$, is close by the tubes, I, and it extends from the bottom of the trough near to its top. The other partition, $g'$, is nearer to the discharge tube, J, and it extends from the top of the trough near to its bottom, as clearly shown in Fig. 2. By this arrangement the water entering the trough has to pass first over the partition, $g$, where the air bubbles have time to separate from the water, and as the water has to turn down afterward under the partition, $g'$, before it can reach the discharge tube, no air will find its way out through said tube. If two of these partitions should not be sufficient, more can be used, and their position may be varied at pleasure as long as they are placed between the tubes, I, and the discharge tube, J. If some of the air should however find its way out of the chamber, D, so that the water rises beyond a desirable height, a valve, $h$, which connects by means of a rod, $i$, with a float, $j$, is caused to close the discharge tube, shutting off the water from the house and giving notice to the inmates that the meter needs attention. It is now necessary to close the faucet on the service pipe behind the meter, and unscrew the nuts, $k$ and $l$, allowing the meter to empty itself through the opening, $l$, and take in a fresh supply of air through the opening, $k$. After the difficulty has been remedied the nuts must be replaced and the water may then be let in upon the meter again.

Having thus fully described my invention, what I claim as new, and desire to secure by to secure by Letters Patent, is—

1. The arrangement of the partitions, $g$ $g'$, in the trough, G, as described, in combination with the air-tight chamber, D, chamber, F, and tubes, I, whereby that portion of the water which does not pass through the measuring buckets is prevented carrying off any of the air in the chamber, D.

2. Arranging in the air chamber, D, a float, $j$, in combination with a valve, $h$, or its equivalent, substantially as and for the purpose described.

B. S. CHURCH.

Witnesses:
  MICH. HUGHES,
  M. M. LIVINGSTON.